United States Patent
Fuerhapter

(10) Patent No.: US 6,640,771 B2
(45) Date of Patent: Nov. 4, 2003

(54) INTERNAL COMBUSTION ENGINE

(75) Inventor: Alois Fuerhapter, Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 10/247,358

(22) Filed: Sep. 20, 2002

(65) Prior Publication Data

US 2003/0056750 A1 Mar. 27, 2003

(30) Foreign Application Priority Data

Sep. 25, 2001 (AT) .......................................... 737/2001 U

(51) Int. Cl.$^7$ ................................................. F02B 17/00
(52) U.S. Cl. ............... 123/295; 123/568.14; 123/90.17; 123/432
(58) Field of Search ............................ 123/295, 568.14, 123/90.17, 432

(56) References Cited

U.S. PATENT DOCUMENTS

| | | | |
|---|---|---|---|
| 4,397,270 A | | 8/1983 | Aoyama |
| 5,647,312 A | | 7/1997 | Salber et al. |
| 6,321,715 B1 | * | 11/2001 | Dong ......................... 123/295 |
| 6,343,585 B1 | * | 2/2002 | Fujieda et al. .............. 123/295 |
| 6,390,056 B1 | * | 5/2002 | Hertzberg et al. .......... 123/295 |
| 2001/0050070 A1 | * | 12/2001 | Xu et al. ................. 123/568.14 |
| 2002/0029757 A1 | * | 3/2002 | Ogawa et al. ............ 123/90.17 |
| 2002/0112692 A1 | * | 8/2002 | Abo et al. .............. 123/568.14 |
| 2003/0005908 A1 | * | 1/2003 | Fujieda et al. .............. 123/295 |

FOREIGN PATENT DOCUMENTS

| | | |
|---|---|---|
| AT | 4872 | 12/2001 |
| DE | 4317607 | 12/1993 |
| DE | 4235620 | 4/1994 |
| DE | 19602013 | 7/1997 |
| DE | 19712356 | 7/1998 |
| DE | 19927429 | 12/1999 |
| EP | 0156996 | 10/1985 |
| EP | 1085192 | 3/2001 |

OTHER PUBLICATIONS

T. Aoyama et al., "An Experimental Study on Premixed--Charge Compression Ignition Gasoline Engine" in SAE Paper 960081, Detroit, Feb. 26–29, 1996 (pp. 1–6).

* cited by examiner

*Primary Examiner*—Erick Solis
(74) *Attorney, Agent, or Firm*—Dykema Gossett PLLC

(57) ABSTRACT

The invention relates to an internal combustion engine run on Otto fuel which may be compression ignition operated in a first operational range (HCCI) and spark ignition operated in a second operational range (SI), with means for adjusting valve timing of at least one intake valve (7) and of at least one exhaust valve (8), with at least one ignition equipment (18) and at least one direct injection equipment (17) in each cylinder (1). To permit in the easiest possible way compression ignition and spark ignition operation on Otto fuel, there is provided at least one intake camshaft (9) for actuating the intake valves (7) and at least one exhaust camshaft (10) for actuating the exhaust valves (8), that at least one intake valve (7) in each cylinder (1) is movable between a first and a second lift position by a device for changing the valve lift (11), and that at least one exhaust valve (8) is actuatable by a residual gas recirculation system (13) during the intake lift.

15 Claims, 3 Drawing Sheets

INTERNAL COMBUSTION ENGINE

BACKGROUND OF THE INVENTION

The invention relates to an internal combustion engine run on Otto fuel which may be compression ignition operated in a first operational range and spark ignition operated in a second operational range, with means for adjusting valve timing of at least one intake valve and of at least one exhaust valve, with at least one ignition equipment and at least one direct injection equipment in each cylinder, and to a method for operating said internal combustion engine.

DESCRIPTION OF PRIOR ART

The combustion of an auto-ignited lean fuel-air mixture has the advantage that extremely low $NO_x$ and soot emissions are obtained on account of the homogeneous distribution of concentration and temperature. This process is known as HCCI combustion (Homogeneous Charge Compression Ignition). HCCI combustion results in low $NO_x$ emissions, which is due to the fact that combustion is initiated at multiple ignition sites, the temperature of the combustion process being relatively low as a result thereof. For HCCI combustion, gasoline presents great advantages over diesel fuel on account of its low autoignition quality and the lower boiling range of between approximately 30° C. and 190° C. The compression ratio may be raised to values similar to those in a diesel engine of about 15 to 17. Since the precise time of ignition can be fixed as desired just before top dead center only when the effective medium pressure is low, the effective medium pressure achievable in HCCI combustion is disadvantageously limited to the part load range as may be gathered from the publication entitled "An Experimental Study on Premixed-Charge Compression Ignition Gasoline Engine", Taro Aoyama et al., SAE Paper No. 960081.

DE 199 27 479 A1 describes a method for operating an engine run on gasoline in which the internal combustion engine is operated in the homogeneous charge compression ignition mode when the effective medium pressure is below a predetermined limit and in the spark ignition mode when said effective medium pressure is above said limit. In this way, all the advantages of HCCI combustion can be made use of without the disadvantages thereof.

HCCI combustion primarily intends to cover the low load and the part load range, whereas spark ignition operation is used for higher part load and full load. In the dynamic operation mode of an internal combustion engine it is absolutely necessary to transition the engine from one operating mode to the other without generating serious losses in torque delivery in the transition phases.

EP 1 085 192 A2 discloses an internal combustion engine which is operated in the homogeneous charge compression ignition mode in the medium part load range and which is operated in the homogeneous charge spark ignition mode in the upper part load range and at full load, and in the lower part load range as well. In the transition range from the spark ignition mode to the compression ignition mode, the quantity of recirculated exhaust is increased in order to ensure safe autoignition. Conversely, on transitioning from the compression ignition mode to the spark ignition mode of operation, the quantity of recirculated exhaust is reduced in time to prevent knocking.

DE 196 02 013 A1 discloses a lift changing device by means of which the valve lift may be varied. Zero lift is also possible.

EP 0 156 996 A1 describes a cam actuated valve timing system with electrohydraulic valve lifting systems that are driven by a microprocessor. The valve lift may be configured in a largely flexible manner.

The U.S. Pat. No. 5,647,312 A discloses a four-stroke internal combustion engine with hybrid control provided with a main intake valve and with an additional intake valve. The cam actuated main intake valve can be actuated into an OFF position by way of a control element provided in the transmission path between intake cam and valve stem. The valve lift of the additional intake valve can be varied through an actuating device as a function of the engine load.

DE 43 17 607 A1 and AT 4.872 U1 describe variable valve gear trains for lift valves, each of them being provided with a hydraulic actuating member arranged in a cup-shaped tappet. Said actuating member permits to produce a hydraulic additional lift in addition to the mechanical lift determined by the cam. In particular the valve gear train presented in the utility model application is suited to produce the hydraulic lift independent of the position of the camshaft, that is to say also for actuating, in the intake phase, an exhaust valve for the purpose of recirculating residual gas for example.

Known internal combustion engines that run on Otto fuel and are operated both in the compression ignition mode and in the spark ignition mode are equipped with an equipment for realizing a fully variable valve gear train and a combustion-guided engine timing system in order to achieve optimal combustion control and, as a result thereof, high efficiency through fast combustion as well as lowest possible $NO_x$ and soot emissions. The disadvantages thereof however are the complexity of construction and the considerable cost involved.

SUMMARY OF THE INVENTION

It is the object of the invention to develop an internal combustion engine that can be securely operated in the simplest possible way on Otto fuel both in a compression ignition and in a spark ignition mode.

This is achieved, in accordance with the invention, in that there is provided at least one intake camshaft for actuating the intake valves and at least one exhaust camshaft for actuating the exhaust valves, that at least one intake valve in each cylinder may be moved between a first and a second lift position by a device for changing the valve lift, and that at least one exhaust valve is actuatable by a residual gas recirculation system during the intake lift. Accordingly, the internal combustion engine is provided with a simple valve gear train with one intake camshaft and with one exhaust camshaft. The lift change between the first, small lift and the second, large lift for at least one intake valve is effected by way of a simple device for changing the valve lift that may be mechanically, hydraulically or electrically actuatable. The device for changing the valve lift can for example be realised by providing in each intake valve two intake cams with varying lift pattern.

In an internal combustion engine with at least two intake valves in each cylinder, there is preferably provided that one intake valve is changeable between the first and the second lift by means of the device for changing the valve lift and that the other intake valve may be actuated into an OFF position by means of a valve cut-off device. Alternatively, there may also be provided, in an internal combustion engine with two separate intake manifolds, that the two intake valves may be moved by the device for changing the valve lift between a first lift and a second lift and that one intake manifold in each cylinder may be cut off by way of a control apparatus.

In the first operational range of the engine, the lift of at least one of the intake valves is reduced from a second lift position to a first lift position. In the second operational range of the engine, the lift of this intake valve is again increased from the first to the second lift position. The cylinder filling is thereby controlled by the throttle. There may also be provided that, in a transition range between the first and the second operational range, the internal combustion engine is operated with an air-fuel ratio $\lambda=1$, the lift of at least one intake valve being changed to the first lift position.

In order to stabilize combustion more specifically during the transition from the spark ignition mode to the compression ignition mode, the opening time in the first operational range of the engine can temporarily be displaced toward the top dead center of ignition. Turbulence in the combustion chamber is increased as a result thereof, which advances combustion. This can be achieved when the intake camshaft is rotatable by an intake phase changer.

In order to achieve the increase in temperature of the charge which is needed for safe autoignition, there is provided that, in the first operational range of the engine, at least one exhaust valve in each cylinder is opened during the intake stroke, the residual gas recirculation being controlled at least through the phase position of said second exhaust lift, the recirculation system for the residual gas being provided with an exhaust phase changer for rotating the exhaust camshaft for the purpose of performing said step of the process. A particularly flexible control of the combustion process may be achieved, when the second exhaust valve is hydraulically or electrically actuated during the intake stroke, phase position and valve opening duration being preferably varied. It is particularly advantageous to adjust duration and/or position of the second exhaust lift for each cylinder individually, the combustion situation and the rate of combustion of the respective one of the cylinders being controlled by said individual adjustment of duration and/or position of the second exhaust lift for each cylinder. In adjusting duration and/or position of the second exhaust lift the stability of combustion may be particularly improved when the operation mode is unsteady. In the spark ignition transition range, the internal residual gas recirculation system permits to achieve unthrottled operation, which will result in a reduction in consumption.

As compared to a fully variable valve gear train, the construction proposed and the method described are simple and inexpensive. It allows compression ignition operation at part load thanks to high internal residual gas.

Since conventionally the gas exchange valves are mechanically actuated, the oil temperature has no effect on the actuation of the valves. This has the advantage that cold start may be carried out in a conventional way in the spark ignition mode.

The mechanical valve actuation permits to achieve high RPMs and high loads with a conventional large lift, which causes the least possible friction losses and makes unrestricted full load operation possible.

Particularly low fuel consumption and very low emissions may be achieved by the lift change in the spark ignition mode at low and medium part load.

BRIEF DESCRIPTION OF THE DRAWINGS

The invention is explained below in closer detail with reference to the drawings, wherein.

DETAILED DESCRIPTION OF THE PREFERRED EMBODIMENTS

Figure 1:
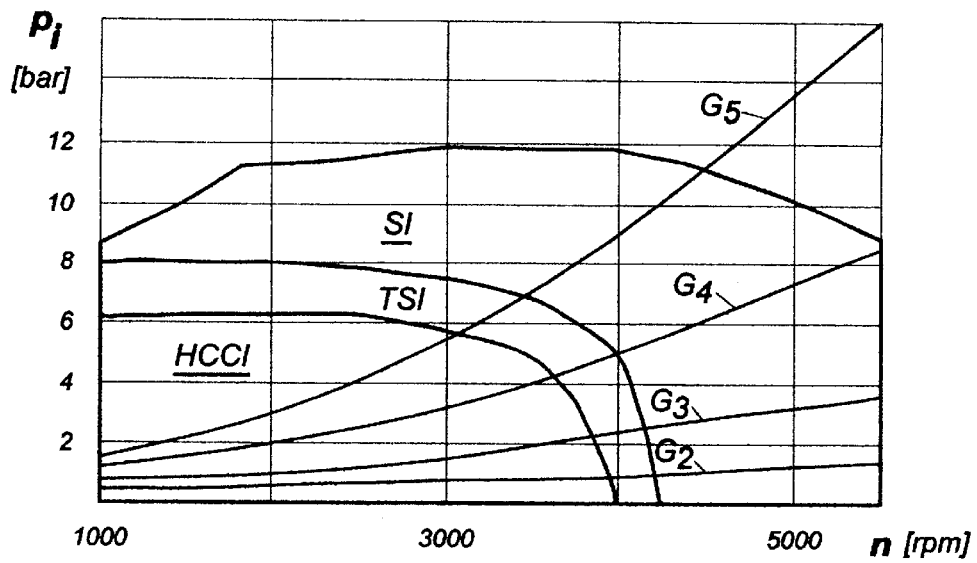
FIG. 1 is a diagram of the engine with the various operational ranges.

In the diagram shown in FIG. 1, the indicated cylinder pressure $p_i$ is plotted down the side of the diagram, whereas rpm n is plotted on the horizontal axis. In the first operational range of the engine, the HCCI mode, the internal combustion engine is run in the homogeneous charge compression ignition mode with a fuel-air ratio $\lambda \geq 1$. This first HCCI operational range of the engine extends from the lower to the medium part load range. In the second operational range of the engine, the SI mode, the internal combustion engine is spark ignition operated with a fuel-air ratio $\lambda \leq 1$. This second operational range of the engine, the SI mode, reaches from high part load to full load.

Between the first operational range of the engine, the HCCI mode, and the second operational range of the engine, the SI mode, there is a transition range TSI in which the internal combustion engine is spark ignition operated with an air/fuel ratio $\lambda=1$. Said transition range lies in the range of the medium part load. During cold start and warm-up, the transition range TSI is extended to reach the idle mode range and is substituted for the first operational range of the engine, the HCCI mode. In the TSI operational range of the engine, the internal residual gas recirculation system permits to achieve further unthrottling and, as a result thereof, to reduce consumption. However, the amount of internal residual gas is considerably lower than in the HCCI operational range.

Figure 2:
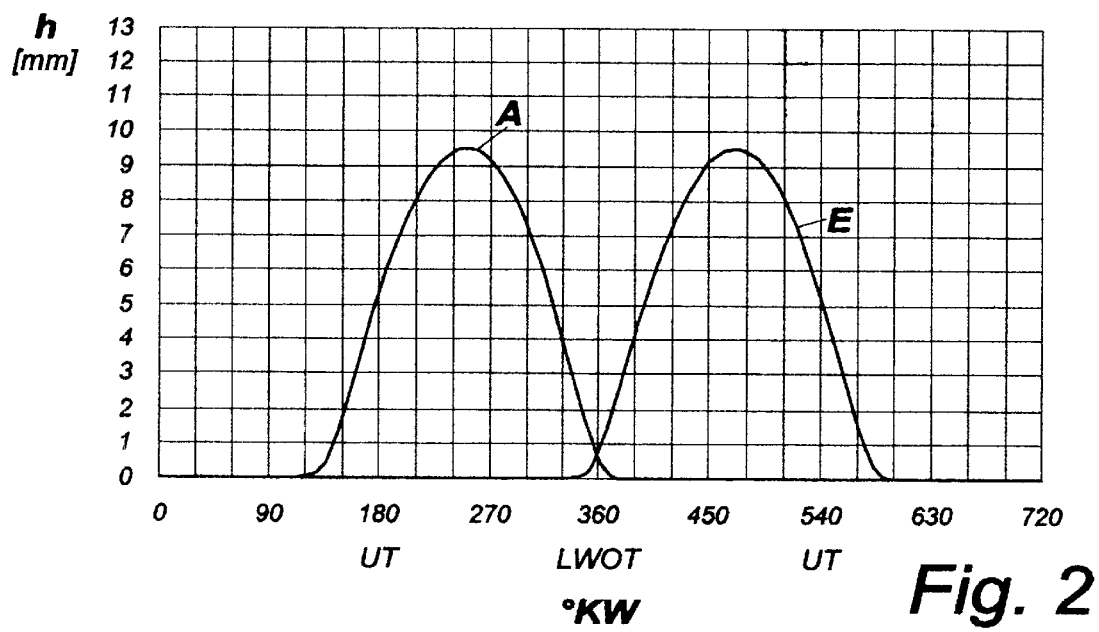
FIG. 2 is a valve lift crank angle diagram for full load and high part load.

FIG. 2 shows the valve timing at full load and high part load, the valve lift h of the exhaust valves and of the intake valves being illustrated. The valve lift curve of the exhaust valves is designed at A, the valve lift curve of the intake valves at E. In the second SI operational range, the internal combustion engine is operated in the normal spark ignition mode with an air-fuel ratio $\lambda \leq 1$. The intake valves have been changed to the second, maximum lift h, which ensures maximum filling additionally controlled by a throttle. As a standard, the exhaust valves are only actuated during the exhaust phase. The second opening of the exhaust is deactivated. The bottom dead center is designed at UT, the gas exchange top dead center at LWOT.

Figure 3:
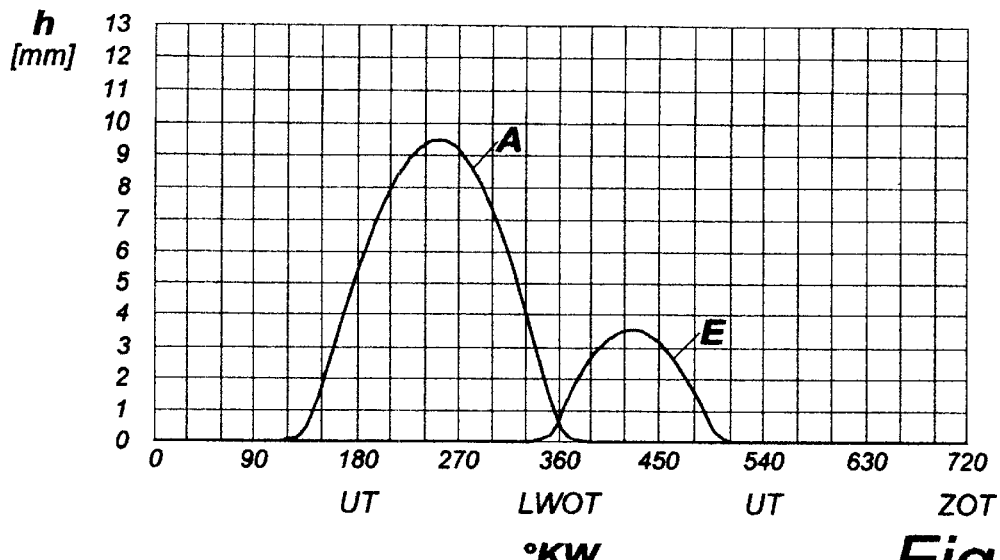
FIG. 3 is a valve lift crank angle diagram for medium part load.

FIG. 3 shows the timing of the exhaust valves at medium part load in the intermediate TSI operational range of the engine. The intake valves have been changed to the first, minimum lift, the small valve lift E shown in FIG. 3 being obtained as a result thereof. The filling is controlled via the throttle. The start of the opening of the intake may be displaced toward top dead center ZOT of ignition in an effort to generate turbulence. The rate of combustion is increased by the increase in turbulence. As a standard, the exhaust valve is only opened during the exhaust phase.

Figure 4:
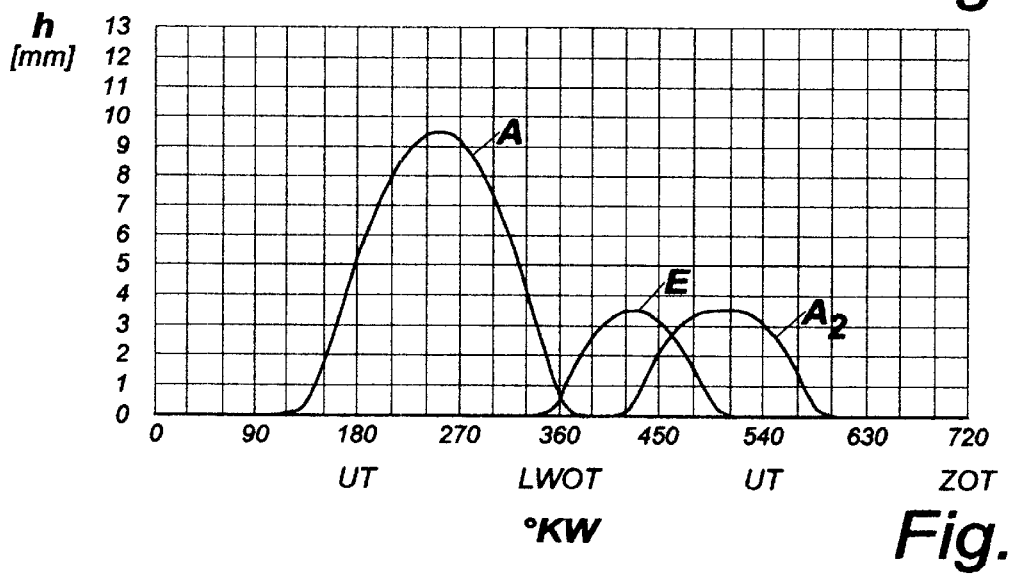
FIG. 4 is a valve lift crank angle diagram for the first operational range of the engine in a first variant of the invention.

FIG. 4 shows the valve timing during the first HCCI operational range of the engine. As in FIG. 3, the intake valves have been changed to the first, minimum lift position. In order to provide the conditions needed for autoignition, the exhaust valves are opened a second time during the intake stroke, which is shown by the curve $A_2$. As a result thereof, residual gases are drawn back into the combustion chamber, which increases the temperature for the next combustion. In this embodiment, the residual gas is only controlled via the phase position.

Figure 5:
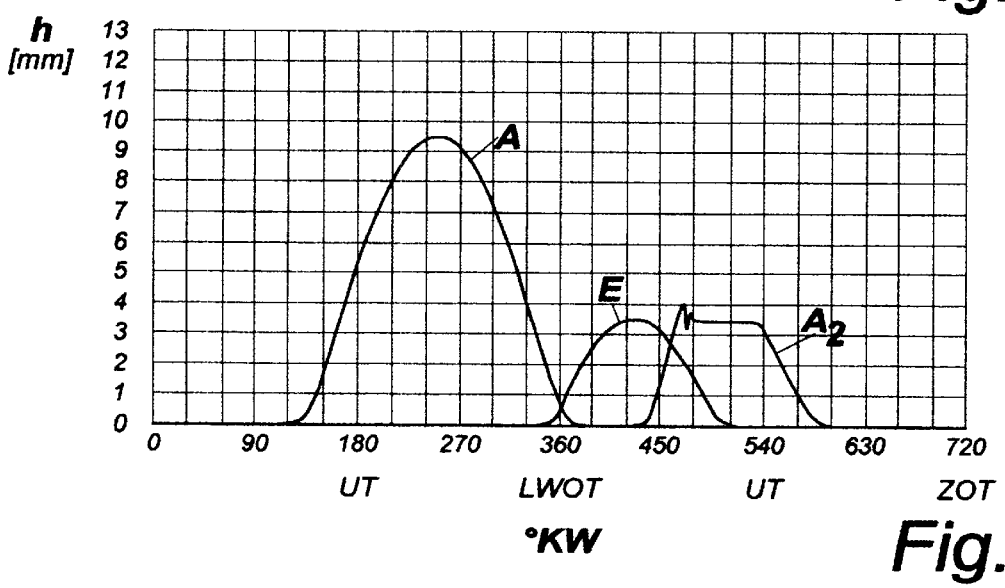
FIG. 5 is a valve lift crank angle diagram for the first operational range of the engine in a second variant of the invention and FIG. 6 is a schematic view of a valve actuating device of an internal combustion engine in accordance with the invention.

FIG. 5 shows the valve timing in the first HCCI operational range in a second variant of the invention. In this case again, the intake valves are actuated with minimum valve lift only. As opposed to FIG. 4, the second exhaust valve lift can be varied in position and length along the line $A_2$, which results in a higher flexibility of the residual gas control. This makes it possible to individually adjust each cylinder. The second exhaust valve lift can be actuated hydraulically or electrically.

The embodiment illustrated in FIG. 4 has the advantage that this represents a very inexpensive, purely mechanical solution that does not require any high pressure oil supply. The system may be operated with minimum friction losses.

Figure 6:
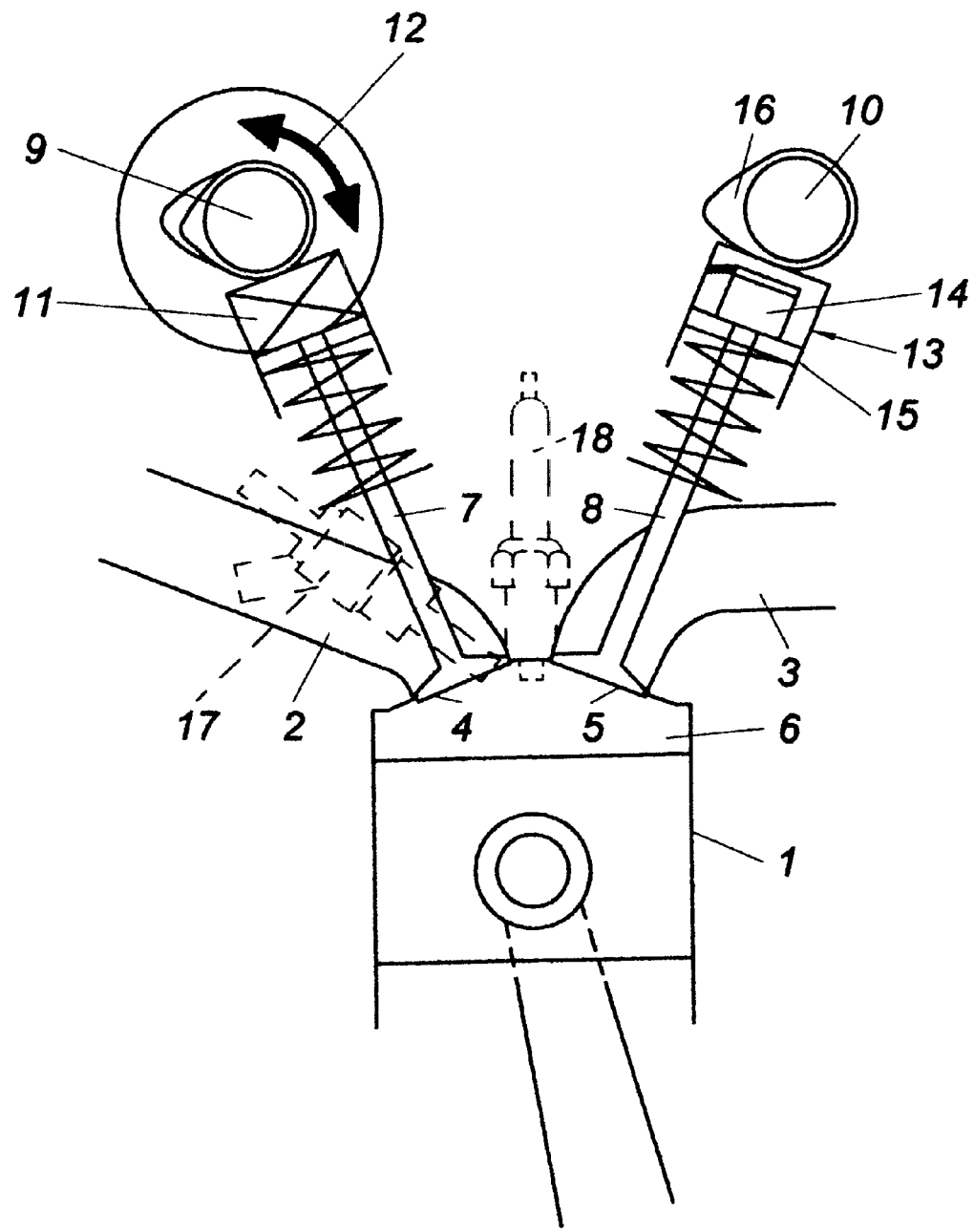

FIG. 6 is a schematic sectional view of a cylinder 1 of a variant of a valve gear train design of an internal combustion engine according to the invention which may be HCCI operated in the first operational range of the engine and SI operated in the second operational range of the engine. An injection device that discharges directly into the combustion chamber 6 is designed at 17 and numeral 18 designates an ignition device. Two intake manifolds 2 and at least one exhaust manifold 3 discharge into cylinder 1, the ports of said manifolds 4, 5 discharging into the combustion chamber 6 being each controlled by one intake valve 7 and one exhaust valve 8 respectively, the intake valves 7 being actuated by an intake camshaft 9 and the exhaust valves 8 by an exhaust camshaft 10. The lift of at least one intake valve 7 may be changed between a first lift and a second lift by means of a device for changing the valve lift 11 as it is described for example in DE 196 02 013 A1. Furthermore, the intake camshaft 12 may be rotated to adjust the timing of the intake valves 7.

To recirculate the internal residual gas, at least one exhaust valve 8 is actuatable through a residual gas recirculation device 13 during the intake lift. The residual gas recirculation device 13 may be provided with a hydraulically or electrically activatable actuating member 14 arranged within the cup-shaped tappet 15 by means of which an additional lift of the exhaust valve 8 may be produced during the intake phase—irrespective of the mechanical exhaust lift determined by the exhaust cam 16. Such a device has been described in AT 4.872 U1.

What is claimed is:

1. An internal combustion engine run on Otto fuel which may be compression ignition operated in a first operational range and spark ignition operated in a second operational range, with means for adjusting valve timing of at least one intake valve and of at least one exhaust valve, with at least one ignition equipment and at least one direct injection equipment in each cylinder, wherein there is provided at least one intake camshaft for actuating the intake valves and at least one exhaust camshaft for actuating the exhaust valves, wherein at least one intake valve in each cylinder is movable between a first and a second lift position by a device for changing the valve lift, and wherein at least one exhaust valve is actuatable by a residual gas recirculation system during an intake lift.

2. The internal combustion engine according to claim 1 with at least two intake valves in each cylinder, wherein one intake valve is movable between the first and the second lift by means of the device for changing the valve lift and wherein the other intake valve is actuatable into an OFF position by means of a valve cut-off device.

3. The internal combustion engine according to claim 1 with two intake valves in each cylinder, one intake manifold discharging into a respective one thereof, wherein the two intake valves are movable by the device for changing the valve lift between the first lift and the second lift and wherein one intake manifold in each cylinder may be cut off by way of a control apparatus.

4. The internal combustion engine according to claim 1, wherein the intake camshaft is rotatable by an intake phase changer.

5. The internal combustion engine according to claim 1, wherein the recirculation system for the residual gas is provided with an exhaust phase changer for rotating the exhaust camshaft.

6. The internal combustion engine according to claim 1, wherein the recirculation system for the residual gas is provided, for at least one exhaust valve, with a movable second exhaust cam for actuating said exhaust valve during an intake stroke.

7. The internal combustion engine according to claim 1, wherein the exhaust valve is hydraulically or electrically actuatable, at least during the intake stroke.

8. A method of operating an internal combustion engine run on Otto fuel which is compression ignition operated in a first operational range with an air-fuel ratio $\lambda \geqq 1$ and spark ignition operated in a second operational range with an air-fuel ratio $\lambda \leqq 1$, combustion being controlled by an internal residual gas recirculation at least, wherein a device for changing a valve lift of at least one intake valve in each cylinder is provided between a first and a second lift, wherein, in the first operational range of the engine, the lift of at least one intake valve is reduced from a second lift position into a first lift position and wherein the lift of said intake valve is increased from the first lift position to the second lift position in the second operational range of the engine.

9. The method according to claim 8, wherein, in a transition range between the first and the second operational range, the internal combustion engine is operated with an air-fuel ratio $\lambda=1$, the lift of at least one intake valve being changed to the first lift position.

10. The method according to claim 8, wherein an opening time in the first operational range of the engine is temporarily displaced toward a top dead center of ignition in an effort to control combustion stability.

11. The method according to claim 8, wherein, in the first operational range of the engine, at least one exhaust valve in each cylinder is opened during an intake phase, the residual gas recirculation being controlled at least through the phase position of said second exhaust lift.

12. The method according to claim 11, wherein the second exhaust valve is hydraulically or electrically actuated during an intake stroke.

13. The method according to claim 12, wherein phase position or opening duration of the exhaust valve is varied.

14. The method according to claim 11, wherein duration or position of the second exhaust lift is adjusted for each cylinder individually.

15. The method according to claim 14, wherein the combustion situation and the rate of combustion of the respective one of the cylinders is controlled by adjusting duration or position of the second exhaust lift for each cylinder individually.

* * * * *